United States Patent
Collier et al.

(10) Patent No.: US 8,794,448 B2
(45) Date of Patent: Aug. 5, 2014

(54) SEPARATION DEVICE

(75) Inventors: Kevin E. Collier, Kaysville, UT (US);
David J. Parkinson, Clevedon (GB)

(73) Assignee: Specialist Process Technologies Limited, Tortola (VG)

( * ) Notice: Subject to any disclaimer, the term of this patent is extended or adjusted under 35 U.S.C. 154(b) by 1013 days.

(21) Appl. No.: 12/808,914

(22) PCT Filed: Dec. 17, 2008

(86) PCT No.: PCT/GB2008/004173
§ 371 (c)(1),
(2), (4) Date: Sep. 20, 2010

(87) PCT Pub. No.: WO2009/077757
PCT Pub. Date: Jun. 25, 2009

(65) Prior Publication Data
US 2011/0003676 A1    Jan. 6, 2011

(30) Foreign Application Priority Data
Dec. 17, 2007 (GB) .................................. 0724572.3

(51) Int. Cl.
*B04B 5/12* (2006.01)
*B01D 17/038* (2006.01)
*B01D 21/26* (2006.01)
*B01D 17/02* (2006.01)

(52) U.S. Cl.
CPC .............. *B04B 5/12* (2013.01); *B04B 2005/125* (2013.01); *B01D 17/0217* (2013.01); *B01D 21/262* (2013.01)
USPC ................... 210/380.1; 210/360.1; 210/380.3; 494/36

(58) Field of Classification Search
CPC  B04B 5/12; B04B 2005/125; B01D 17/0217; B01D 21/262
USPC .................... 210/360.1, 380.1, 380.3; 494/36
See application file for complete search history.

(56) References Cited

U.S. PATENT DOCUMENTS

| 3,876,135 A | 4/1975 | Harvey et al. |
| 3,964,996 A | 6/1976 | Holz et al. |

(Continued)

FOREIGN PATENT DOCUMENTS

| DE | 2404334 A1 | 8/1975 |
| EP | 0226405 A2 | 6/1987 |

OTHER PUBLICATIONS

The International Preliminary Report on Patentability for PCT/GB2008/004173, dated Nov. 4, 2009.*

(Continued)

*Primary Examiner* — David A Reifsnyder
(74) *Attorney, Agent, or Firm* — Honigman Miller Schwartz and Cohn LLP (57) ABSTRACT

A separator device comprises a cylindrical separation chamber within which a motor-driven rotor is situated. The rotor has vanes. In operation, an inflowing mixture enters through an inlet and is subjected to centrifugal force imposed by the rotation of the rotor. A lighter liquid fraction leaves through an annular outlet, and a heavier liquid fraction leaves through an annular outlet. Solids pass through a screen to a region where rotational flow is reduced or absent. The solids in the region are fluidized by liquid passing through the screen, and are extracted from outlets. Control means is provided to control operation of the device in response to changes in the incoming mixture.

14 Claims, 8 Drawing Sheets

(56) References Cited

U.S. PATENT DOCUMENTS

| | | |
|---|---|---|
| 4,010,891 A | 3/1977 | Kartinen |
| 4,702,837 A | 10/1987 | Lecoffre et al. |
| 5,061,370 A | 10/1991 | Ferland et al. |
| 5,182,031 A | 1/1993 | Lamort |
| 5,207,810 A | 5/1993 | Sheth |
| 5,271,163 A | 12/1993 | Pikus et al. |
| 5,630,557 A | 5/1997 | Barthelmess |
| 2003/0000144 A1 | 1/2003 | Maton |

OTHER PUBLICATIONS

International Search Report for PCT/GB2008/004173 dated Apr. 2, 2009.

European Examination Report for Application 08863222.9 dated Sep. 21, 2012.

* cited by examiner

SEPARATION DEVICE

BACKGROUND OF THE INVENTION

This invention relates to a separation device, and is particularly, although not exclusively, concerned with a separation device for separating components of an incoming mixture comprising liquid phases of different densities, and a solid component.

The separation of components and phases of a fluid mixture is important in many industrial processes. In the context of this specification, the term "phase" is used not simply to refer to different states (solid, liquid or gas) of a material, but more generally to embrace different materials that are in the same state as each other (e.g. two immiscible liquid components of different densities).

The separation of immiscible liquids is particularly challenging, especially when their densities differ only slightly. If solids are present in the mixture, the solids can provide nucleation sites in one or other of the liquid components, so promoting the formation of stable emulsions. If such stable emulsions form, they can be very difficult to break in order to enable separation of the two liquid phases of the emulsion.

While separation processes can be conducted in batches, it is generally preferred, in industrial processes, for separation to occur in a steady state continuous flow method.

Known processes for separating fluid mixtures can generally be regarded as operating either on a cyclone principle or a centrifuge principle. In cyclone separators, the flow is generally introduced into a chamber in a tangential manner at high energy, so inducing a rapidly rotating flow pattern within the chamber, causing lighter components to migrate towards the chamber axis, while heavier components migrate towards the outside. Although flow guides may be provided in cyclone separators, these tend to be fixed and it is desirable for the interior of the chambers to offer minimal obstruction to the circulating flow within them.

Typically, a centrifuge comprises a vessel which is rotatable about an axis. The vessel is rotated at high speed, and, again, denser components of a mixture migrate to the outside while lighter components accumulate nearer the centrifuge axis. In some cases, the outer wall of the vessel is porous, so that liquid components can be extracted, leaving solid materials accumulated on the porous wall.

Known separators, whether cyclones or centrifuges, suffer from a lack of flexibility. Consequently, they are unable to process incoming mixtures adequately at variable flow rates, or where the parameters of the incoming mixture change. For example, known separators are often unable to separate mixtures adequately where the ratio of different fluid components changes. In addition, solid components of incoming mixtures have a tendency to accumulate within the separators, which are unable to "self-clean". Consequently, solids deposits build up over time, requiring the separator to be taken off-line for cleaning purposes.

Known separators often do not work adequately in a pressurized system, or require pumps to pressurize the fluids being processed.

In cyclone separators, the rotational velocity of the fluid within the separator is uncontrolled, and such changes in rotational velocity can upset the efficiency of separation of immiscible liquids. The requirement for centrifuges to rotate at high speed imposes a limitation on their size and capacity. Also, centrifuges do not have a low G zone where solids can concentrate without compacting.

The lack of control in cyclones and centrifuges makes it difficult or impossible to vary the residence time within the unit of individual components of the original mixture.

Current separators cannot easily be retro-fitted into existing processes as used, for example, in the oil and gas production industry to replace internal components on tail end production, where the liquids to be processed contain water. If the water is a continuous phase in the mixture, i.e. the mixture contains more water than oil, the deliverable may be oil with a reduced volumetric flow rate delivered to a further process for polishing to achieve the required oil quality, while the water may either be clean enough to be discharged into the environment or require tertiary treatment prior to discharge or reinjection into the production zone of the oil reservoir. In the case of heavy oil production, particularly when the oil is produced by pumping it out of the reservoir, the final treatment stage often has water in relatively small quantities, which needs to be separated from the heavy oil, as in processes for dehydrating crude, in which a counter-current flow of clean water is generated within the unit to desalt the crude.

The current technology also has inadequate performance in the treatment and removal of sulphur species (sweetening) from crude oil.

The following documents constitute examples of existing separators.

US 2003/0000144 discloses a gasification reactor apparatus in which solids materials are fed to a reactor vessel containing rotating paddles which direct the solid material to the outside of the vessel while produced gas is extracted from the centre. The material admitted to the vessel is not a mixture, but is the solid material only.

U.S. Pat. No. 4,702,837 discloses a rotary vortex separator comprising a vessel which is rotated about its longitudinal axis to achieve separation of a water/oil mixture.

EP 0226405 discloses a fuel pump arrangement in which an impeller concentrates air within the fuel towards the axis of the impeller so that fuel which is substantially free of air can be dispensed.

U.S. Pat. No. 5,207,810 discloses a downhole gas separator having a vaned rotor operating in an outer cylinder. Mixture is circulated by the rotor, and gas is separated from liquid components of the mixture under centrifugal force.

U.S. Pat. No. 5,271,163 discloses a treatment vessel for flowable materials in which a flowable material is acted upon by paddles mounted on a rotor while subjected to a flow of gas.

U.S. Pat. No. 5,630,557 discloses a grinding device in which fine material formed by the grinding process passes through a sifter rotor on the way to the outlet. The sifter rotor acts to prevent grinding beads from passing to the outlet.

According to the present invention there is provided a separation device comprising an outer wall defining a separation chamber in which a motor-driven rotor is disposed for rotation relative to the outer wall about a rotor axis, the separation chamber having an inlet for a mixture to be separated, and a plurality of outlets at different distances from the rotor axis for discharging respective phases of the mixture from the separation chamber, the outlets including two fluid phase outlets, comprising a lighter phase outlet and a heavier phase outlet, the heavier phase outlet being situated radially outwardly of the lighter phase outlet with respect to the rotor axis, the rotor having at least one vane extending outwardly with respect to the rotor axis, and being surrounded at least partially by a perforated screen which is fixed with respect to the outer wall and is spaced from the outer wall to define an annular zone between the screen and the outer wall, the outlets further comprising a solids outlet provided in the outer wall.

In an embodiment in accordance with the present invention, the outer wall is cylindrical and the rotor is coaxial with the outer wall. The vane may be one of a plurality of vanes, and the vanes may extend substantially radially with respect to the rotor axis. At the outer periphery of the rotor, at least one of the vanes may have a tip region which is inclined to the radial direction.

The vanes may extend axially with respect to the rotor axis, and may occupy substantially the full axial extent of the separation chamber. The vanes may be mounted on a shaft, which may be adapted for driving connection to a motor for driving the rotor. The rotor may be provided with support plates, for example in the form of radial discs. The support plates may have apertures to enable flow to take place from one side of each support plate to the other. The apertures may also be adapted to receive the vanes.

The inlet to the separation chamber may be disposed tangentially with respect to the axis of rotation of the rotor, so as to induce a rotary motion within the separation chamber. The separation chamber may comprise a central region occupied by the rotor, and end region at opposite ends of the central region. With such a construction, the inlet may open into one of the end regions of the chambers, and the outlet may open into the other end region of the chamber.

The screen may extend along substantially the full length of the rotor.

The solids outlet may comprise a plurality of outlet ports distributed lengthwise of the outer wall. The solids outlet is preferably disposed in the lower region of the outer wall, and may be connected to a fluidizing vessel to enable transport of particulate solids materials drawn from the separator.

The lighter phase outlet may comprise an annular slot centered on the rotor axis, opening into a lighter phase compartment. The lighter phase compartment may have a settlement zone, and swirl reducing stator elements may be disposed within the lighter phase compartment between the annular slot and the settlement zone. A gas outlet may be provided, which communicates with the settlement zone to enable gas to be vented from the lighter phase compartment. A lighter phase outlet may open into the lighter phase compartment, for example in a tangential direction with respect to the rotor axis. If swirl reducing stator elements are provided, so that there is a relatively quiescent settlement zone within the lighter phase compartment, the gas outlet may open into the lighter phase compartment at an upper region of the settlement zone, and the lighter phase outlet may open into the lighter phase compartment at a lower region of the settlement zone. However, if the swirl reducing stator elements are not present, or effect only a limited reduction in swirl in the lighter phase compartment, the gas outlet may be situated radially inwardly of the lighter phase outlet with respect to the rotor axis.

The heavier phase outlet may comprise an annular slot centered on the rotor axis, opening into a heavier phase compartment into which the heavier phase outlet opens. The heavier phase outlet may extend tangentially with respect to the rotor axis.

Control means may be provided for controlling at least one operating parameter of the separation device. The parameters which may be controlled may be one or more of the rotational speed of the rotor, the temperature within the separation chamber, and the outlet pressure of at least one of the outlets.

The control means may be responsive to at least one process parameter. This process parameter may be one or more of the volume flow rate of the mixture through the inlet, the ratio of phases in the inflowing mixture, the radial position of an interface between the phases in the separator, for example an interface between heavier and lighter liquid phases, the density, temperature or viscosity of the inflowing mixture, the viscosity of at least one of the phases, and a parameter of the solid content in the mixture, for example the particle size, shape factor or concentration.

The separation device may also have an outlet for removal of a rag layer.

The separation device may comprise part of an extraction unit comprising a vessel which receives a mixture to be separated, and in which a separation device as defined above is situated.

For a better understanding of the present invention and to show more clearly how it may be carried in effect, reference will now be made, by way of example, to the accompanying drawings, in which

DETAILED DESCRIPTION OF THE INVENTION

Figure 1:
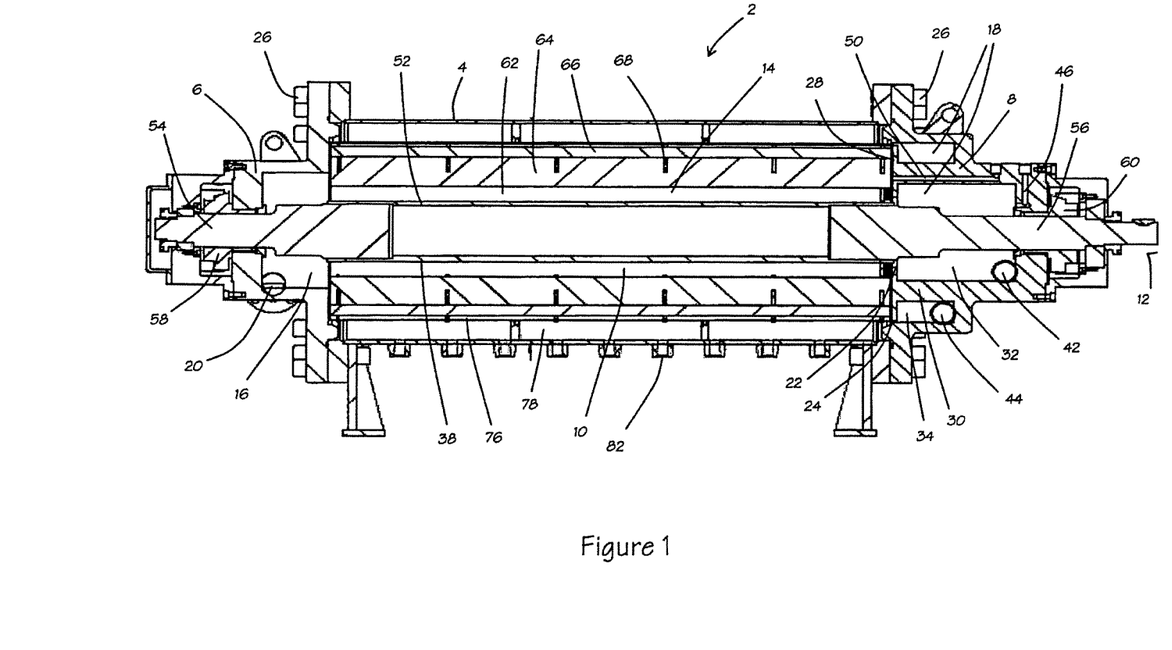
FIG. 1 is a sectional view, taken on the line A-A in FIG. 2, of a separator.
Figure 2:
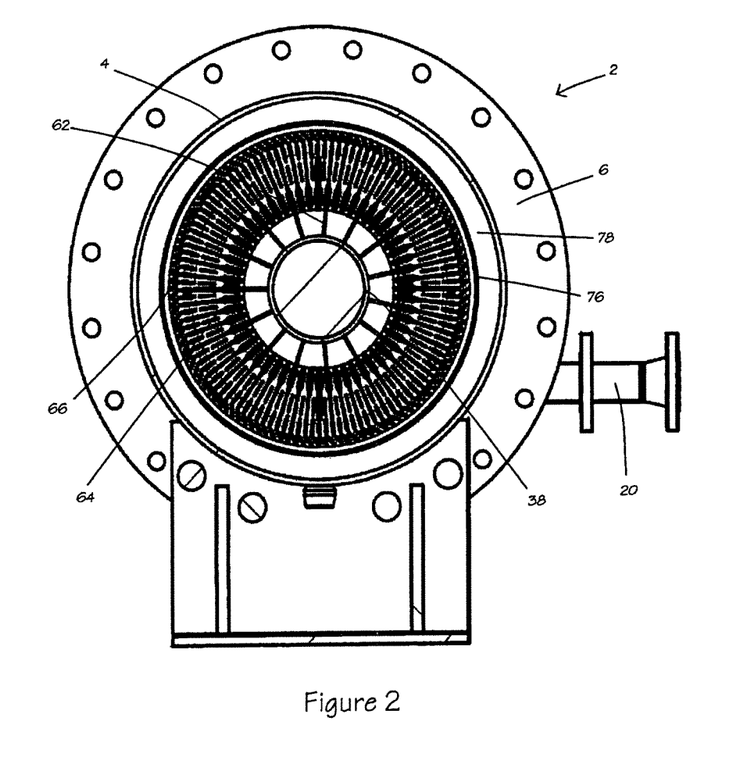
FIG. 2 is a sectional view of the separator taken on the line B-B in FIG. 1.
Figure 3:
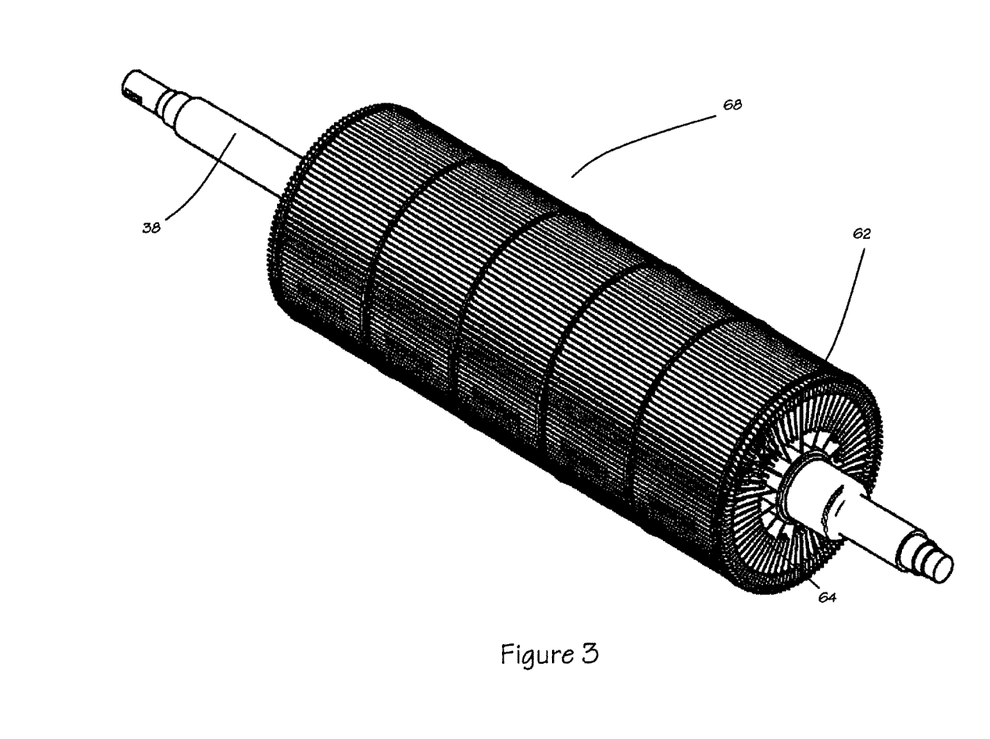
FIG. 3 is a perspective view of a rotor of the separator shown in FIGS. 1 and 2.

With reference to FIGS. 1 and 2, the separator comprises a vessel 2, constructed from an outer wall 4 and end caps 6 and 8. The interior of the vessel 2 defines a separation chamber 10 in which a rotor 12 is mounted for rotation.

The separation chamber 10 is substantially cylindrical and comprises a central region 14 and inlet and outlet end regions 16, 18. A mixture inlet 20 opens into the inlet region 16, and light and heavy phase outlets 22, 24 open into the outlet region 18. The inlet and outlet end regions 16,18 are defined within the respective end caps 6,8 which are attached to the outer wall by bolts 26 passing through respective flanges of the end caps 6, 8 and the outer wall 4. The inlet end region 16 is substantially cylindrical with a diameter less than that of the central region 14. The inlet 20 comprises a cylindrical passage disposed tangentially to the longitudinal axis of the separation chamber 10.

The outlet end region 18 is also substantially cylindrical and has a smaller diameter than the separation chamber 14. A weir 28, extending radially of the separation chamber 10, separates the central region 14 from the outlet end region 18. The outlet end region 18 is divided by a partition 30 into a lighter phase outlet chamber 32 and a heavier phase outlet chamber 34.

The lighter phase outlet 22 is formed by an annular slot, centered on the longitudinal axis of the separator chamber 10, defined by the inner edge of the weir 28 and the outer surface of a support shaft 38 of the rotor 12. The outlet 22 provides communication between the central region 14 and the lighter phase outlet chamber 32.

A lighter phase outlet port 42 is provided in the lower region of the lighter phase outlet chamber 32, through which the lighter phase exits the lighter phase outlet chamber 32. A gas outlet passage 46 extends axially from a radially inwards position of the lighter phase outlet chamber 32 and deflects through 90° to exit the end cap 8 radially.

The heavier phase outlet 24 is formed by an annular slot, centered on the longitudinal axis of the separator chamber 10, defined by the outer edge of the weir 28 and the outer wall of the heavier phase outlet chamber 34. The annular slot 37 provides communication between the central region 14 and the heavier phase outlet chamber 34.

A heavier phase outlet port 44 is provided in the lower region of the heavier phase outlet chamber 34, through which the heavier phase exits the heavier phase outlet chamber 34.

A rag layer removal passage 50 is provided within the partition 30, and opens into the separation chamber 14 at a position between the inner and outer edges of the weir 28. The passage 50 deflects through 90° to exit radially from the end cap 8.

The rotor 12 is rotatable about the longitudinal axis of the shaft 38. The shaft 38 extends along the length of the separation chamber 14, the longitudinal axis of the shaft 38 being substantially aligned with the longitudinal axis of the chamber 14.

The shaft 38 comprises a hollow mid-portion 52 and two solid end-sections 54,56. The end-sections 54,56 are mounted in, and extend through, respective bearing-seal assemblies 58,60 disposed at respective ends of the shaft 38. The bearing-seal assemblies 58,60 are housed within the end caps 6,8 and serve to seal the separation chamber 10 whilst allowing for rotation of the shaft 38.

Figure 4:
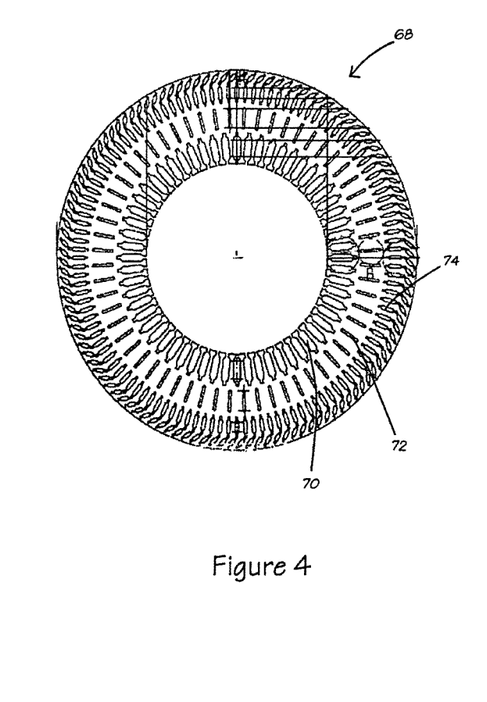
FIG. 4 is an end view of a rotor disc of the rotor of FIG. 3.

A plurality of axial vanes 62, 64, 66 are supported on the shaft 38 by radial discs 68. The radial discs 68 are distributed along the longitudinal axis of the chamber 14 and are spaced at equidistant points along the internal wall of the main separation chamber 14. As shown in FIG. 4, each radial disc 68 is ring-shaped and has a series of vane slots 70 set into the internal edge of the ring at equiangular points and radiating outward toward the outer edge of the disc 68. Flow apertures 72 are provided in the middle region of the disc 68 approximately midway between the inner and outer edges of the disc 68. The flow apertures 72 are positioned radially outward of the vane slots 70 and have the same angular separation as the slots 70 and an angular position midway between the vane slots 70. Vane apertures 74 are provided in the external region of the disc 68. These vane apertures 74 are positioned radially outward of the flow apertures 72. Each vane aperture 74 has a first portion extending radially outward and a second portion inclined to the first portion.

Figure 5:
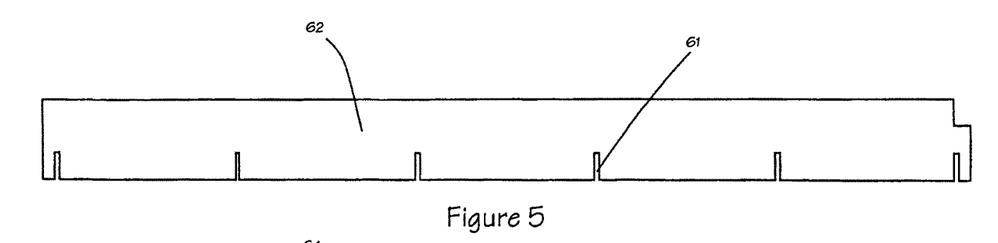
FIG. 5 is a side view of an extended inner vane of the rotor of FIG. 3.

Three sets of vanes, an inner vane set 64, an extended inner vane set 62 and an angled outer vane set 66, extend substantially radially outward with respect to the axis of rotation of the rotor and along the portion of the shaft 38 that is situated in the central region 14 of the separation chamber 10. The inner vanes 64, shown in FIG. 6 and the extended inner vanes 62, shown in FIG. 5, engage with the vane slots 70 of the radial disc 68. Each inner vane 64 and extended inner vane 62 has multiple slots 61,63 formed along the outer edge of the vane 62,64. Each slot 61,63 engages with a corresponding vane slot 70 on each of the radial discs 68 thereby forming a spliced connection between each vane 62,64 and each disc 68. The width of the central region of each vane slot 70 is greater than the thickness of the vanes 62,64. An aperture is thus created between the vane 62,64 and the disc 68 through which the mixture can flow.

The inner region of the extended inner vanes 62 extends radially inward of the internal edge of the radial disc 68 such that the inner edge abuts the outer surface of the shaft 38, as can be seen in FIG. 2.

Figures 6, 7:
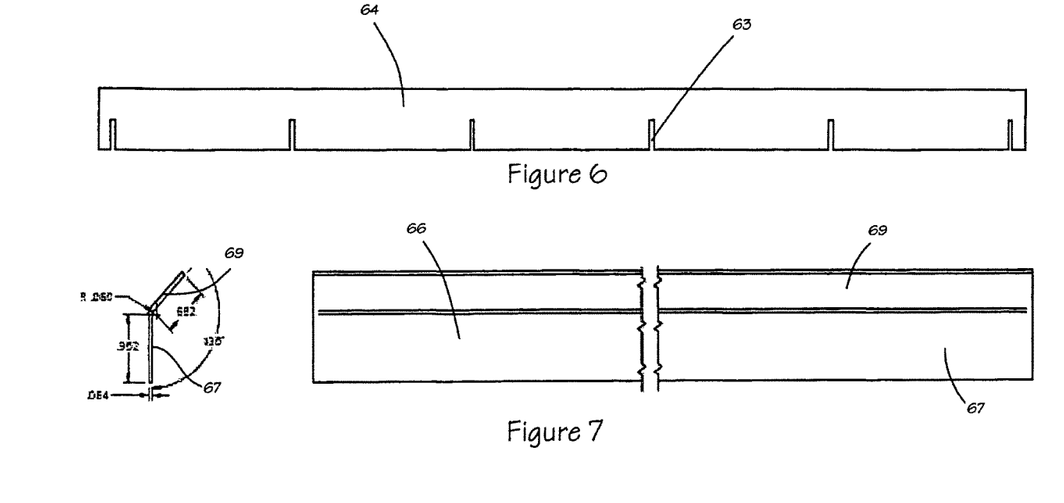
FIG. 6 is a side view of an inner vane of the rotor of FIG. 3.
FIG. 7 is a side view of an angled outer vane of the rotor of FIG. 3.

Each angled outer vane 66 locates in a respective one of the angled outer apertures 74. The vanes 66 are thus secured by the radial discs 68. The width of the central regions of both the radial and angled portion of each angled aperture 74 is greater than the thickness of the angled outer vane 66 thus creating apertures between the vane 66 and the angled aperture 74 through which the mixture can flow. As can be seen in FIG. 7, each angled outer vane 66 has two limbs 67, 69 which are inclined to each other, as viewed from the end, by an obtuse angle, for example an angle of 135°, corresponding to the angle between the first and second portions of the vane apertures 74.

Figure 8:
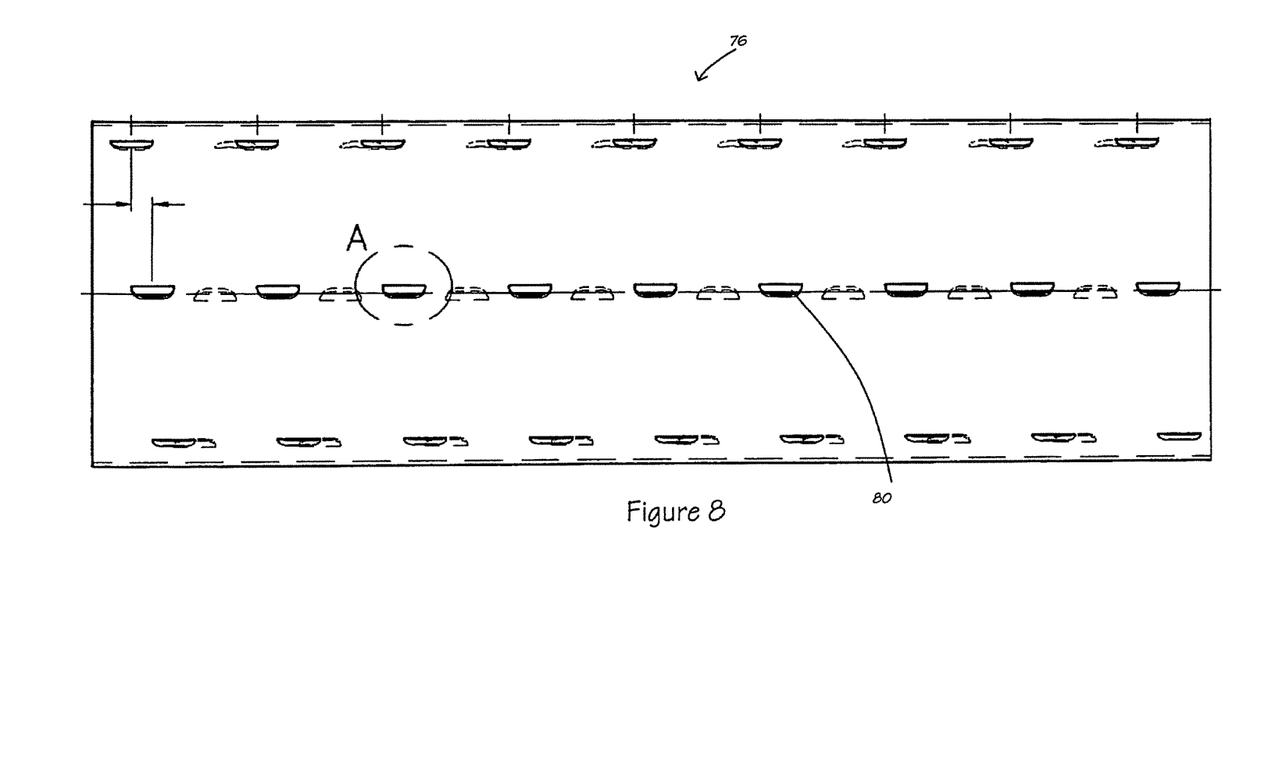
FIG. 8 is a side view of a perforated screen of the separator of FIGS. 1 and 2.

FIG. 8 shows a side view of a substantially cylindrical screen 76 which is fixed to the vessel 2 and centered on the longitudinal axis of the rotor 38. As shown in FIG. 1, the screen 76 creates an annular region 78 between the outer wall of the chamber 14 and the screen 76. The screen 76 is perforated with holes 80. The holes 80 are countersunk from the outside and allow liquid and solids to pass through. The angle of countersink is different on opposite sides of each hole, in the circumferential direction. The result of this is that fluid passing through the holes 80 from the interior to the exterior of the screen 76 is ejected in a tangential direction.

A plurality of solid outlets 82, shown in FIG. 1, exit from the outer wall 4 of the central region of the separation chamber 14. These solid outlets 82 are distributed axially, at equidistant points, along the lower region of the chamber wall 4 and exit radially from the chamber 14.

Figure 10:
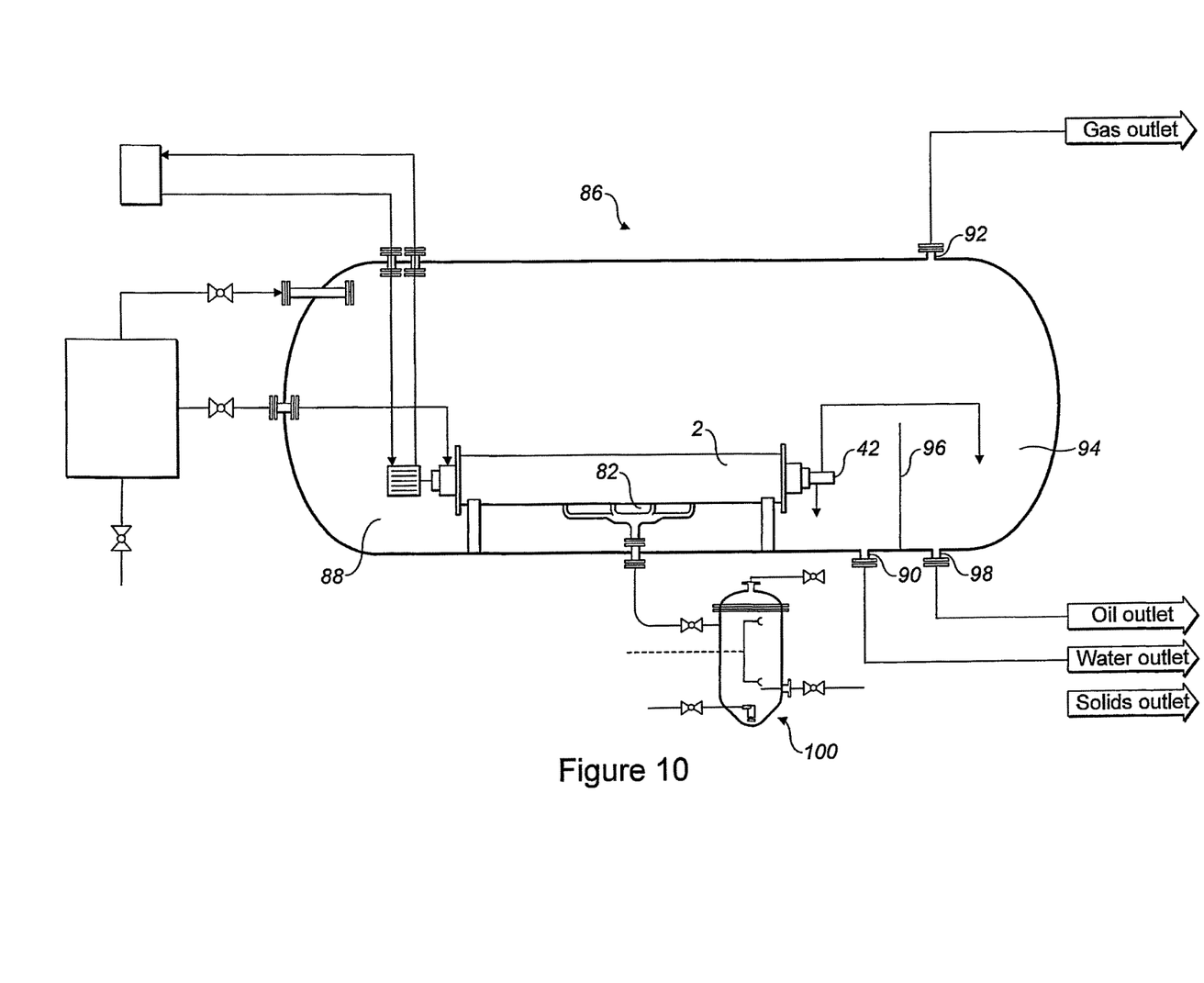
FIG. 10 corresponds to FIG. 8 but shows a fluidizing vessel for receiving solids from the separator.

In one embodiment the solid outlets 82 can be connected to a fluidizing chamber 84 as shown in FIG. 10.

The separator device may be used to process an influent mixture comprising two immiscible liquids, a particulate solid and a gas. For example, in an oil-field application, the mixture may be oil, water, sand and hydrocarbon gas. The inflowing mixture enters tangentially through the inlet 20 into the inlet region 16 and then passes from the inlet region 16 into the central region of the separation chamber 14 where it is acted upon by the vanes 62, 64, 66 as they rotate about the axis of the rotor 12. The angular velocity of the mixture in the separation chamber 14 is thus dictated by the angular velocity of the rotor 12. The angular velocity of the rotor 12 may be user defined, or automatically regulated based on measured flow parameters.

If the inflowing mixture has a high solids content, the inlet region 16 may be configured to achieve a preliminary solids separation using the swirling motion imparted by the tangential inlet 20. Thus, the separated solids may pass directly to the region 78 without entering the rotor 12. For example, the inlet region 16 may be longer, or the separation chamber may be shorter, than shown in FIG. 1. Alternatively, the inlet region 16 may have its own independent solids outlet. Such a separator would have a particular use in treating mixtures containing drill cuttings from oil and gas exploration.

By actively controlling the angular velocity of the flow, the mixture will be subjected to a controlled centrifugal force. As the mixture flows along the length of the chamber 14 the centrifugal force causes the heavier phase liquid to migrate towards the radially outer region of the chamber 14 thereby displacing the lighter phase liquid inward toward the inner region of the chamber 14. At the outlet end region of the chamber 14, separation will be substantially complete such that an interface will exist between the two liquid phases. The interface has a radial position, with respect to the rotor 12 axis, which is dependent on the extraction flow rates of the two phases.

Solids contained within the mixture which have a density greater than the liquid phases are accelerated radially outward within the separation chamber 14 and pass through the holes 80 in the screen 76 into the annular region 78. The orientation of the holes 80, and the inclined outer limbs 69 of the vanes 66, serve to reduce the rotation of the flow substantially to zero so that in the annular region 78 centrifugal forces are negligible. The pressurized heavier phase liquid is ejected through each hole 80 as a jet which serves to agitate solids accumulating in the annular region 78. The combined effect of the reduction of the centrifugal force and the jets is to maintain the solid phase in a fluidized state. The fluidized solid phase exits through outlet passages 82 through the lower portion of the chamber 14.

During use, the radial position of the interface preferably lies radially outward of the inner edge of the weir 28 and radially inward of the outer edge of the weir 28. In practice, the interface is not always a clean transition between the lighter and heavier phases, but can be a "rag layer" consisting of a very tight stable emulsion of one phase in the other. Such a "rag layer" may be broken by the addition of heat, chemicals or the centrifugal forces present in the separation chamber. However, if this does not occur, it is desirable for the thickness of this rag layer to be minimized, and so it is extracted through the rag layer removal port 50.

The vanes 62, 64, 66 may be arranged so as to create a pulsing force or electric charge between adjacent opposing vanes in the manner of an electrostatic coalescer to grow droplet size, or to achieve electro coagulation to create nucleation sites to grow flocs from dissolved solids. Alternatively, ultrasound can be distributed between opposing vanes to aid droplet coalescence or to reduce the size of solid particles such as drill cuttings or mud balls that are carried in the incoming mixture.

The heavier phase passes through the heavier phase outlet 24 into the heavier phase outlet chamber 34 from where it exits through the heavier phase outlet port 38.

The lighter phase exits the central region of the separation chamber 14 through the lighter phase outlet 22 into the lighter phase outlet chamber 32. Residual swirl in the lighter phase outlet chamber 32 causes any gas present in the lighter phase to propagate radially inwards where it vents through the gas outlet passage 46. The remaining liquid present in the lighter phase will exit the outlet chamber 32 via the lighter phase outlet port 42.

The downstream pressure of both the lighter phase outlet 42 and the heavier phase outlet 44 can be adjusted to increase or decrease the backpressure independently. This provides means by which the mass, or volume, flow rate and the radial position of the liquid interface can be adjusted.

The rotor 12 may be configured to apply a pumping action on the flow through the separator so as to increase the discharge pressures.

The radial position of the liquid interface is dependent on various parameters, including the composition of the inflowing mixture and the rate at which the liquid phase fractions are removed from the outlet chambers 32, 34. These removal rates can be controlled by adjusting the downstream backpressure at the outlets 39, 42, for example by means of suitable control valves. Control means (not shown) is provided for controlling these valves in response to operating parameters which are detected by sensing means or direct visual observation.

The position and thickness of the rag layer may also be monitored either visually or by a suitable sensor. If the radial position of the rag layer moves towards the lighter phase outlet 22 then the pressure ratio of the back pressure applied outlet to the lighter phase outlet port 42 compared with the back pressure applied to the heavier phase outlet port 44 can be increased, and vice versa. If the rag layer becomes too thick, or too thin, then the backpressure applied to the rag layer removal passage 50 can be decreased or increased respectively.

Increasing and decreasing the overall pressure applied at both outlet ports 42,44 can also be used to control the overall settling time within the separation chamber 10.

Parameters of the solid phase, in particular the shape factor, size and density of the particles, can be measured. Since each of these parameters affects the settling rate of the particles, and hence the rate at which they migrate towards the annular region 78 between the screen 76 and the chamber wall 4, they can be used to specify the angular velocity of the rotor 12 required for particular flow conditions. The shape factor can also be used, in conjunction with other parameters, to specify the backpressure supplied to the outlets 42,44. By way of example, a visual process analyzer may be used to monitor particle size, shape factor and concentration at the mixture inlet 20. Such an analyzer comprises a video microscope allied to software which freezes single frames of the video output and applies image analysis techniques to determine parameters of the particles in the incoming flow.

Viscosity, temperature, density or pressure of the influent or effluent phases are measured parameters that can be used to regulate the angular velocity of the rotor and the backpressure at the lighter phase and heavier phase outlets 42,44. Thus, if, for example, the density of an oil component of the incoming flow varies, either as a result of temperature changes or because the composition of the oil changes, the residence time required to achieve adequate separation may change, and this may necessitate a change in the rotational speed of the rotor 12. The pressure difference between the lighter phase outlet 42 and the heavier phase outlet 44 may be used as a control parameter for regulating the speed of the rotor 12 or other operating parameters of the separator, such as the back pressures at the outlets 42, 44.

Figure 9:
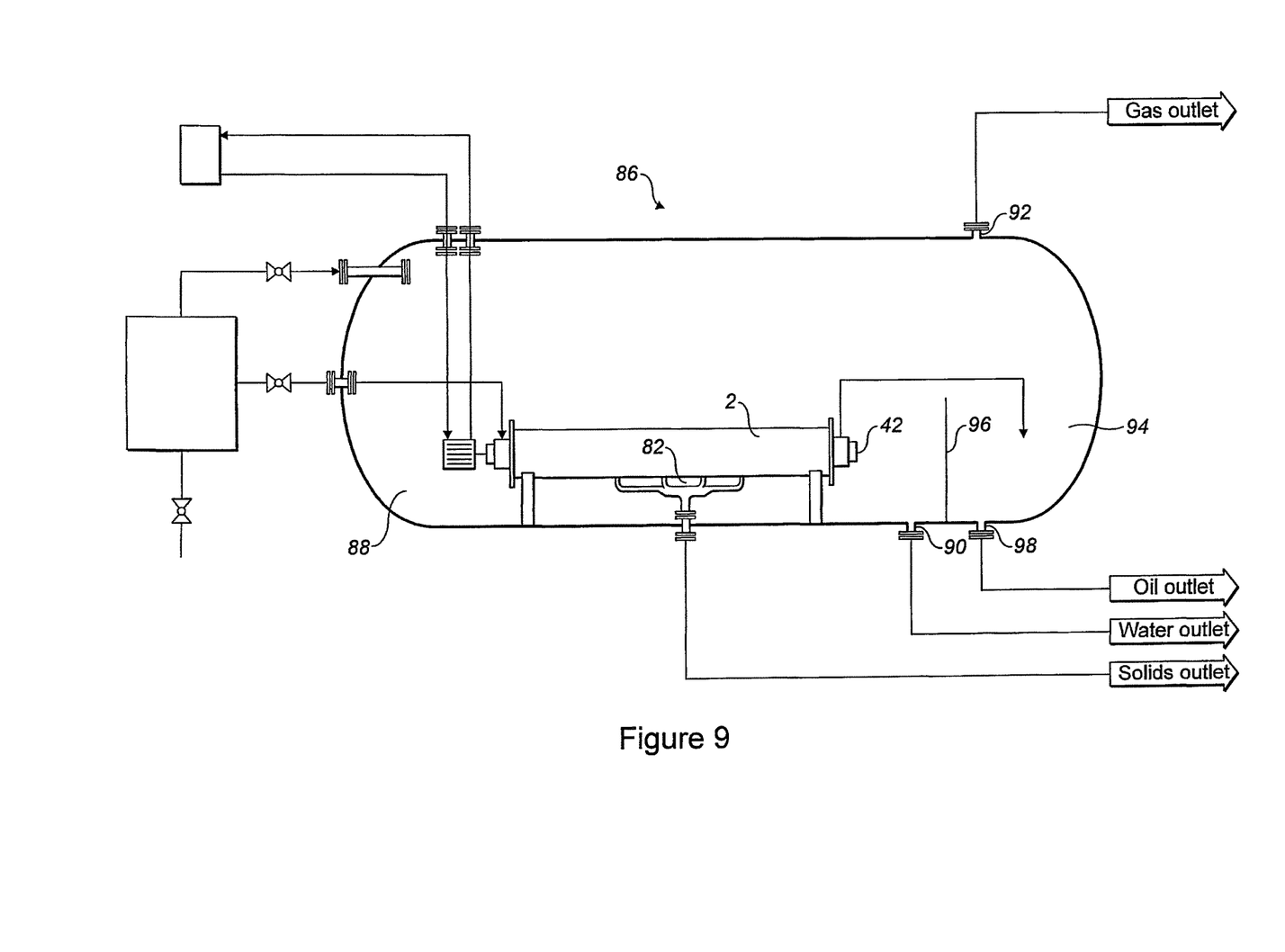
FIG. 9 is a schematic view of a fluid treatment apparatus incorporating the separator of FIGS. 1 and 2.

FIGS. 9 and 10 are schematic representations of the separation vessel 2 positioned within a standard oil field separator 86. The separator 86 comprises an upstream reservoir 88 in which the separating vessel is located, an outlet for water 90 in the lower region of the upstream reservoir 88, a gas outlet 92 exiting from the upper region of the separator 86, a downstream reservoir 94 separated from the upstream reservoir 88 by a wall 96 and an oil outlet 98 exiting from the lower region of the downstream reservoir 94. The influent mixture enters the reservoir where it undergoes a conventional separation process in which the different phases report to various levels within the reservoir 88. This configuration allows for conventional separation and extraction of free gas or water from the oil upstream of the separation vessel 2 thereby reducing the flow volumes passing through the separation vessel 2. Oil and solids are extracted from the multiphase mixture which passes through the separation vessel 2. The oil is expelled from the lighter phase outlet 42 of the separation vessel 2 into the downstream reservoir 94. The solids exit through the solids outlet 82 to a fluidizing system 100 as shown in FIG. 10, for onward pipeline transport. This configuration has a particular advantage during the latter stages of oil extraction when high water-to-oil or gas-to-oil ratios are being removed. A further advantage of this configuration is the reduction of the pressure differential between that acting on the outer wall 4 of the vessel 2 and the internal pressure within the chamber 10. This allows the separation chamber to be manufactured to withstand lower pressure differentials, which may translate into substantial cost or weight savings.

While the device is shown in the drawings in a horizontal disposition, it can also be employed in a vertical disposition (i.e. with the rotor shaft 38 extending upwardly).

Although the invention has been described above by reference to an oilfield application, the separation device has multiple applications where separation of multiphase flow is required.

For example, the device may be used in water treatment applications for the removal of solids precipitated during PH correction, to replace large flocculation clarifiers as currently used.

A further application of the device is in the separation of fragile flocs from a mixture. Thus the separation device may be used in the treatment of waste from food manufacturing processes or to de-water and concentrate a bio-mass for use in bio-fuel plants. For example, potato peeling waste from a frozen chip plant may be dewatered and concentrated by the separator device, and subsequently employed in a co-generation unit fuelled by gas evolved from the potato waste.

The device may also find applications in the processing of waste streams from bio-fuel plants such as the production of ethanol from starch or corn.

A further use is in offshore heavy oil desalting and dewatering to produce an oil product meeting BS & W (basic sediment and water) specifications.

For some applications, it may be desirable to add a flocculating agent or other treatment agent to the mixture to precipitate dissolved contaminants or coagulate small particles such as rare earths. Added treatment agents may also be used to extract unwanted components from the fluid, such as sulphur from crude oil. The treatment agents may be added to the mixture before it is admitted to the separation chamber, but alternatively a further inlet (not shown) may be provided for admitting the treatment agent directly into the separation chamber, for example at the central axis. Thus, the device may operate as a counter current flow contactor, with the agent migrating radially outwardly through the flow as a result of density differentials.

The separator device can be used at low or elevated pressures. It is suitable for economical mass production since the end caps 6 and 8 may be the same for a variety of different lengths of the separation chamber 10. Thus the capacity of the unit can be increased by increasing the lengths of the outer wall 4, the mid-portion 50 of the shaft 38, and the vanes 62, 64, 66. If necessary, additional discs 68 may be fitted.

Separation devices relying on centrifugal and centripetal forces can be modeled on the basis of Stokes Law.

Stokes Law for solving for fall, settling or Terminal Velocity (Vt) is shown below:

$$V_t = \frac{gd^2(\rho_p - \rho_m)}{18\mu}$$

Where:
g=acceleration of gravity
d=particle or droplet/bubble diameter
$\rho_p$=density of particle
$\rho_m$=density of medium
$\mu$=viscosity of medium It can be seen therefore by a person skilled in the art that this base equation can be changed allowing the designer to select an equation to solve for a different unknown i.e. the particular particle or droplet required to be separated from a particular medium such as air or water.

| | |
|---|---|
| $V_t = \dfrac{gd^2(\rho_p - \rho_m)}{18\mu}$ | terminal, fall or settling velocity |
| $g = \dfrac{18\,\mu V_t}{d^2(\rho_p - \rho_m)}$ | acceleration of gravity |
| $d = \sqrt{\dfrac{18\,\mu V}{g(\rho_p - \rho_m)}}$ | particle diameter |
| $\rho_m = \rho_p - \dfrac{18\,\mu V_t}{gd^2}$ | density of medium (e.g. water, air, oil) |
| $\rho_p = \dfrac{18\,\mu V_t}{gd^2} + \rho_m$ | particle density |
| $\mu = \dfrac{gd^2(\rho_p - \rho_m)}{18\,V_t}$ | viscosity of medium |

It is also known that other changes can be caused to accelerate the rate of separation such as:

Increases in the acceleration of gravity by the use of centrifugal or centripetal force Increases in the particle or droplet/bubble diameter by coalescence or agglomeration Changes in viscosity or drag force of the medium by change in temperature or by injection of fine bubbles of gas, such as in induced gas floatation units Increasing the hold up or retention time of the fluids to be separated in the separator Decreasing the amount of liquid or droplet shear caused by the hydraulic characteristics feeding the separator or the fluid flow regimes within.

The invention claimed is:

1. A separation device comprising:
an outer wall defining a separation chamber;
a motor-driven rotor disposed within the chamber for rotation relative to the outer wall about a rotor axis;
at least one vane disposed on the rotor and extending outwardly with respect to the rotor axis;
a perforated screen which at least partially surrounds the rotor, the screen being fixed with respect to the outer wall and spaced from the outer wall to define an annular zone between the screen and the outer wall;
an inlet to the separation chamber for a mixture to be separated;
a plurality of outlets from the separation chamber, situated at different distances from the rotor axis for discharging respective phases of the mixture from the separation chamber, the outlets including:
two fluid phase outlets, comprising a lighter phase outlet and a heavier phase outlet, the heavier phase outlet being situated radially outwardly of the lighter phase outlet with respect to the rotor axis, and
a solids outlet provided in the outer wall.

2. A separation device as claimed in claim 1, in which the outer wall is cylindrical about the rotor axis.

3. A separation device as claimed in claim 1, in which the vane is one of a plurality of vanes which are parallel to the rotor axis and extend radially outwardly with respect to the rotor axis.

4. A separation device as claimed in claim 3, in which the vanes are supported by support plates which comprise apertured radial discs.

5. A separation device as claimed in claim 1, in which the chamber comprises:
   a central region occupied by the rotor, and
   end regions at opposite ends of the rotor.

6. A separation device as claimed in claim 5, in which the inlet opens into one end region of the chamber and is directed tangentially of the rotor axis.

7. A separation device as claimed in claim 6, in which the fluid phase outlets open into the other end region of the chamber at a position radially inwards of the screen.

8. A separation device as claimed in claim 1, in which the lighter phase outlet comprises an annular slot centered on the rotor axis, the separation device further comprising:
   a lighter phase compartment into which the annular slot opens;
   a settlement zone situated within the lighter phase compartment;
   swirl reducing stator elements disposed between the annular slot and the settlement zone; and
   a gas outlet situated at an upper region of the settlement zone.

9. A separation device as claimed in claim 1, in which the heavier phase outlet comprises an annular slot centered on the rotor axis, opening into a heavier phase compartment.

10. A separation device as claimed in claim 1, in which the solids outlet is connected to a fluidizing vessel.

11. A separation device as claimed in claim 1, further comprising a control means for controlling a differential pressure within the separation device.

12. A separation device as claimed in claim 1, in which the separation chamber is provided with a further inlet for admitting a treatment material.

13. A separation device comprising:
   a cylindrical outer wall defining a separation chamber having a central axis;
   a motor-driven rotor disposed within the chamber for rotation relative to the outer wall about the central axis;
   a plurality of vanes disposed on the rotor, the vanes being parallel to the central axis and extending radially outwardly with respect to the central axis;
   a plurality of support plates which comprise apertured radial discs which support the vanes;
   a perforated screen which at least partially surrounds the rotor, the screen being fixed with respect to the outer wall and spaced from the outer wall to define an annular zone between the screen and the outer wall;
   an inlet to the separation chamber for a mixture to be separated;
   a plurality of outlets from the separation chamber, situated at different distances from the rotor axis for discharging respective phases of the mixture from the separation chamber, the outlets including:
   two fluid phase outlets, comprising a lighter phase outlet and a heavier phase outlet, the heavier phase outlet being situated radially outwardly of the lighter phase outlet with respect to the rotor axis, and
   a solids outlet provided in the outer wall.

14. An extraction unit incorporating a separation chamber comprising:
   an outer wall defining a separation chamber;
   a motor-driven rotor disposed within the chamber for rotation relative to the outer wall about a rotor axis;
   at least one vane disposed on the rotor and extending outwardly with respect to the rotor axis;
   a perforated screen which at least partially surrounds the rotor, the screen being fixed with respect to the outer wall and spaced from the outer wall to define an annular zone between the screen and the outer wall;
   an inlet to the separation chamber for a mixture to be separated;
   a plurality of outlets from the separation chamber, situated at different distances from the rotor axis for discharging respective phases of the mixture from the separation chamber, the outlets including:
   two fluid phase outlets, comprising a lighter phase outlet and a heavier phase outlet, the heavier phase outlet being situated radially outwardly of the lighter phase outlet with respect to the rotor axis, and
   a solids outlet provided in the outer wall.

* * * * *